United States Patent [19]

Takagi

[11] Patent Number: 5,534,968
[45] Date of Patent: Jul. 9, 1996

[54] CAMERA HAVING VARIABLE PHOTOMETRY CONDITIONS

[75] Inventor: Tadao Takagi, Yokohama, Japan

[73] Assignee: Nikon Corporation, Tokyo, Japan

[21] Appl. No.: 209,016

[22] Filed: Mar. 11, 1994

[30] Foreign Application Priority Data

Mar. 12, 1993 [JP] Japan .................................. 5-052633

[51] Int. Cl.[6] ............................ G03B 7/08; G03B 17/00; G03B 29/00
[52] U.S. Cl. ....................... 354/432; 354/289.12; 354/76
[58] Field of Search .................................. 354/430, 432, 354/481, 410, 412, 289.12, 76

[56] References Cited

U.S. PATENT DOCUMENTS

| | | |
|---|---|---|
| Re. 34,140 | 12/1992 | Nakajima ................................ 354/412 |
| 4,494,853 | 1/1985 | Watanabe . |
| 5,146,258 | 9/1992 | Bell et al. . |
| 5,198,851 | 3/1993 | Ogawa .................................... 354/412 |

*Primary Examiner*—David M. Gray
*Assistant Examiner*—Matthew Miller
*Attorney, Agent, or Firm*—Oliff & Berridge

[57] ABSTRACT

The boundary shape of a photometry region and the sensitivity distribution of the photometry areas included in the photometry region are specified by, for example, the CPU of a camera based on the input of selection commands from an electronic system notebook detachably connected to the camera via an external equipment connection terminal of the camera. The CPU receives the boundary shape and the sensitivity distribution corresponding to the instructions from the electronic system notebook from a memory, such as an EEPROM, in the camera, and stores them in an internal memory of the CPU.

19 Claims, 8 Drawing Sheets

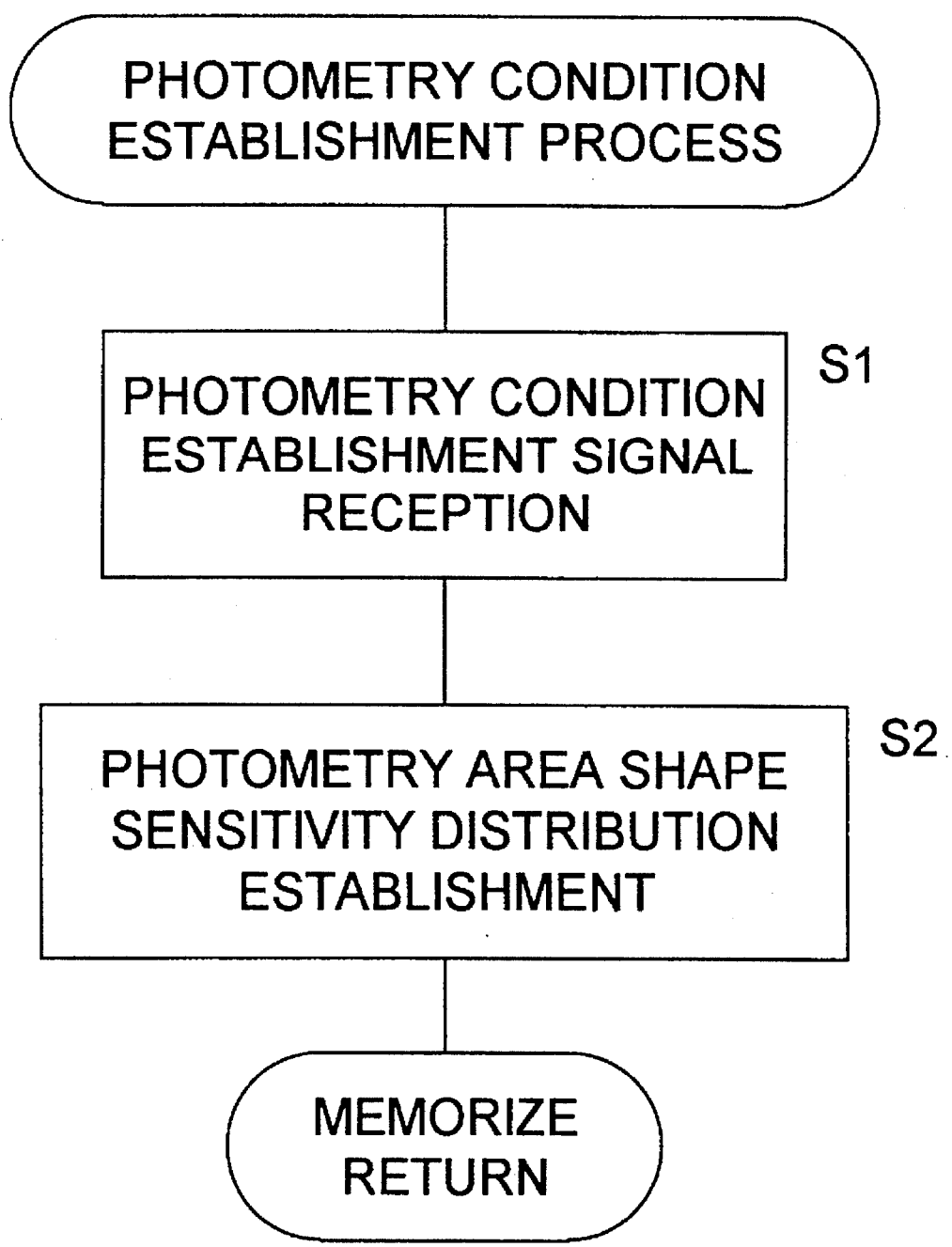

CAMERA HAVING VARIABLE PHOTOMETRY CONDITIONS

BACKGROUND OF THE INVENTION

1. Field of the Invention

This invention is related to a camera that can change at least one of the following: 1) a boundary shape of a photometry region to be established in a portion of a subject field; and 2) a sensitivity distribution of each photometry area within a photometry region that is divided into multiple photometry areas.

2. Discussion of Related Art

Conventional cameras exist that are equipped with an exposure control mechanism that can switch the photometry mode of the camera between one mode in which measurements are taken over the entire subject field, and another mode in which measurements are taken primarily in the central area of the subject field (hereafter referred to as the center emphasis photometry mode). Additionally, some of these types of cameras are capable of changing the boundary shape of the photometry region using an operative component, such as a switch or button, provided in the main body of the camera at the time the center emphasis photometry mode is selected.

However, alteration of the boundary shape of the photometry region during the center emphasis photometry mode does not occur frequently, and quite often the fact that alteration can be done easily using an operative part in the main body of the camera leads to accidental, unwanted alteration of the boundary shape during camera usage. Furthermore, in order to enable the user of the camera to make alterations having a variety of significance (i.e., by enabling the user to select from among several possible boundary shapes), the number of operative components provided in the camera needs to be increased, causing the boundary shape selection operation to become more complicated, which is a source of much trouble. This is a major problem that prohibits the creation of smaller cameras and that contributes to confusion on the part of the user.

Moreover, conventional cameras only can change the boundary shape of the photometry region during the center emphasis photometry mode, and are not capable of altering photometry conditions (for example, sensitivity distribution) in detail within the photometry region, for example, by measuring the central area more intensely than the boundary section of the photometry region.

SUMMARY OF THE INVENTION

An object of the present invention is to provide a camera that can enable the selection of various boundary shapes for the photometry region to be established in a portion of the subject field, without making the camera larger and more complicated and without causing confusion when using the camera. Another object is to provide a camera that can perform more diverse alteration of photometry conditions than conventional cameras.

In order to achieve the foregoing and other objects, according to a first aspect of the invention, a camera is provided that can specify a portion of a subject field as a photometry region.

A boundary shape signal receiving means is provided to receive a boundary shape instruction signal transmitted from outside of the camera. The boundary shape instruction signal instructs the boundary shape of the photometry region to be established in a portion of the subject field. A boundary shape establishment means of the camera establishes the boundary shape of the photometry region based on the boundary shape instruction signal received by the boundary shape signal receiving means.

In this camera, it is possible to provide the boundary shape establishment means with a storage means, such as a memory, to store the boundary shapes of multiple photometry regions, which can be selected by the camera user. Based on the boundary shape instruction signal, a boundary shape selection means then selects one boundary shape as the boundary shape of the photometry region from the multiple boundary shapes stored in the storage means. The photometry region can be established, for example, in the central area of the subject field.

A second aspect of the invention is applicable to cameras capable of measuring light by dividing the photometry region established in the subject field into multiple photometry areas. This second aspect of the invention is achieved by providing a sensitivity distribution instruction means to instruct sensitivity distribution in the photometry areas included in the photometry region. A sensitivity distribution establishment means establishes sensitivity distribution of the photometry areas included in the photometry region based on the instruction received from the sensitivity distribution instruction means.

In this camera, it is possible to provide a sensitivity signal receiving means to receive a sensitivity distribution instruction signal transmitted from outside of the camera. The sensitivity distribution instruction signal indicates the sensitivity distribution of each photometry area included in the photometry region. Accordingly, sensitivity distribution of the photometry region by the sensitivity distribution instruction means is instructed based on the sensitivity distribution instruction signal received by the sensitivity signal receiving means.

The sensitivity distribution establishment means can include a storage device such as a memory to store multiple sensitivity distributions, which can be selected by the camera user. Based on the sensitivity distribution instruction, a sensitivity distribution selection means then selects one sensitivity distribution for the photometry region from the multiple sensitivity distributions stored in the storage means.

The first and second aspects of the invention can be applied in combination to a camera capable of measuring light by dividing the photometry region established in a portion of the subject field into multiple photometry areas. In such a camera, the camera is provided with a boundary shape signal receiving means to receive a boundary shape instruction signal transmitted from outside the camera. The boundary shape instruction signal instructs the boundary shape of the photometry region to be established in a portion of the subject field. A boundary shape establishment means establishes the boundary shape of the photometry region based on the boundary shape instruction signal received by the boundary shape signal receiving means. A sensitivity distribution instruction means instructs sensitivity distribution of the photometry areas included in the selected photometry region. A sensitivity distribution establishment means establishes the sensitivity distribution for the photometry areas included in the selected photometry region based on the instruction received from the sensitivity distribution instruction means.

It also is possible to provide a sensitivity signal receiving means to receive a sensitivity distribution instruction signal transmitted from outside the camera so as to instruct the sensitivity distribution of each photometry area included in the photometry region. The sensitivity distribution instruction means then provides instructions for the sensitivity distribution of the photometry areas based on the sensitivity distribution instruction signal received by the sensitivity signal receiving means.

With a camera incorporating the first aspect of the invention, a photometry region having a boundary shape corresponding to the boundary shape instruction signal received by the boundary shape signal receiving means is established in the portion of the subject field by the boundary shape establishing means. The boundary shape corresponding to the boundary shape instruction signal received by the boundary shape signal receiving means can be selected from a storage means, such as a memory, by the boundary shape selection means.

With a camera incorporating the second aspect of the invention, a sensitivity distribution corresponding to an instruction from the sensitivity distribution instruction means is established by the sensitivity distribution establishing means. The sensitivity distribution instruction means can instruct the sensitivity distribution establishing means to establish the sensitivity distribution based on a sensitivity distribution instruction signal received from outside of the camera by a sensitivity signal receiving means. The sensitivity distribution corresponding to the sensitivity distribution instruction from the sensitivity distribution instruction means can be selected from a storage means, such as a memory, by the sensitivity distribution selection means.

BRIEF DESCRIPTION OF THE DRAWINGS

The invention will be described in detail with reference to the following drawings in which like reference numerals refer to like elements and wherein:

FIG. 8 is a flowchart showing the procedure for the photometry condition alteration process performed by the CPU in FIG. 5.

DETAILED DESCRIPTION OF PREFERRED EMBODIMENT

Figure 1:
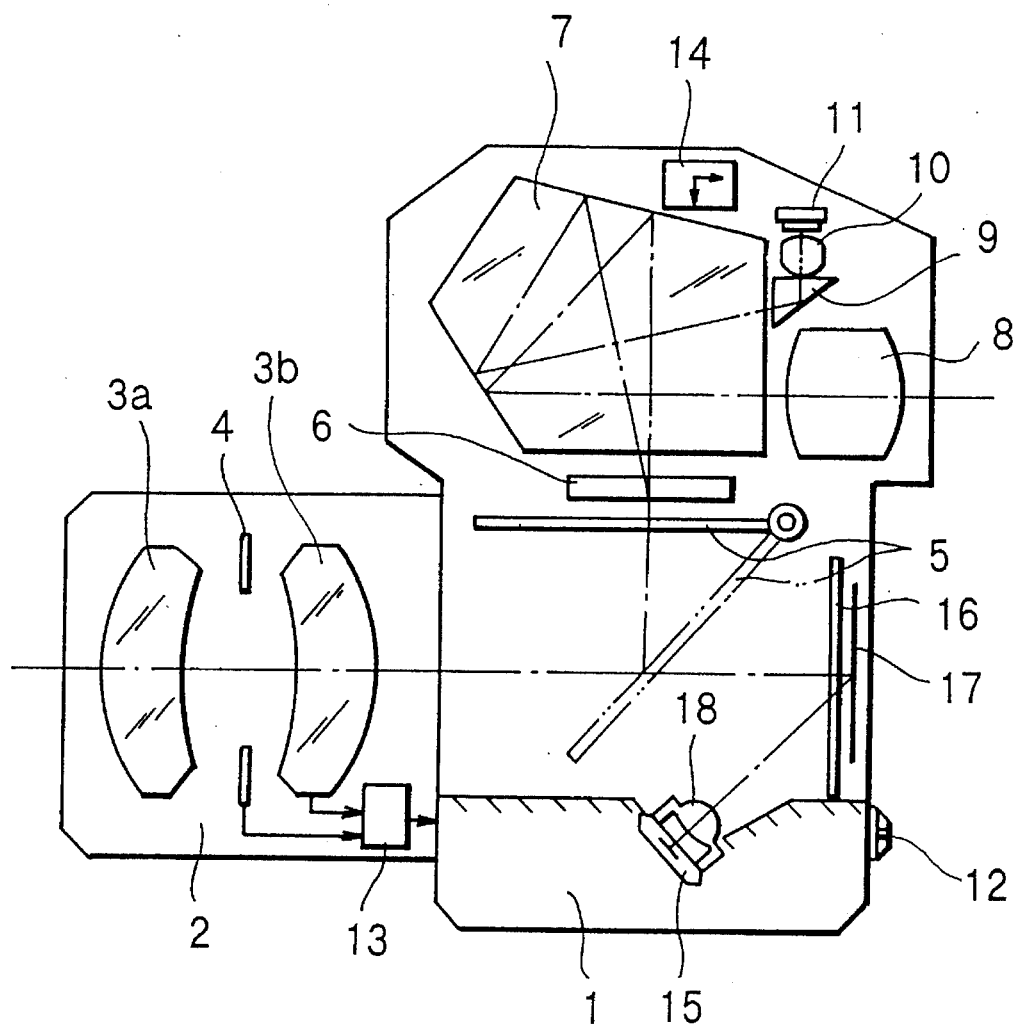
FIG. 1 is a vertical cross section of a camera capable of use with the invention.

An explanation of an embodiment of the invention is described hereafter, with reference to FIGS. 1–8.

The body 1 of a camera includes an interchangeable lens barrel 2 mounted to the body 1, photography lenses 3a and 3b, and an diaphragm 4. Light rays from the subject field pass through the rear lens 3b, and are reflected by a mirror 5, which moves to the position indicated by the dotted line, and forms a primary image on a finder screen 6. The primary image on the finder screen 6 is reflected by a pentagonal prism 7, and enters an eye piece 8 before reaching the photographer's pupil as an image of the subject. Part of the light rays entering the pentagonal prism 7 is reflected by a prism 9 and enters a photometry lens 10 to form a secondary image on a photometry element 11 for the purpose of photometry.

An external equipment connection terminal 12 is provided for communicating with external equipment such as, for example, an electronic system notebook or a personal computer, etc. Through this external equipment connection terminal 12, the CPU 21 of the camera 1 (FIG. 5), to be explained later, is connected to the electronic system notebook or a personal computer, etc., enabling the alteration of the photometry conditions from outside the camera. The details of the alteration of the photometry conditions will be explained later.

A Read Only Memory (ROM) 13 in the lens barrel 2 transmits photo distance data corresponding to the position of the lens 3b, and lens data corresponding to the aperture value of the diaphragm 4 to the camera body 1. A posture detector 14 is provided to discern whether the camera body 1 is in the horizontal position, with the pentagonal prism 7 on the top, or in the right vertical position with the pentagonal prism 7 on the right, or in the left vertical position with the pentagonal prism 7 on the left. A photometry element 15 is provided for the purpose of dimming the flashing light when a flash is used. The light rays emitted from the flash and reflected by the subject pass through lenses 3a, 3b and the shutter 16, are then reflected by the film surface 17, and are collected by a lens 18 to form an image on the photometry element 15.

Figure 2:
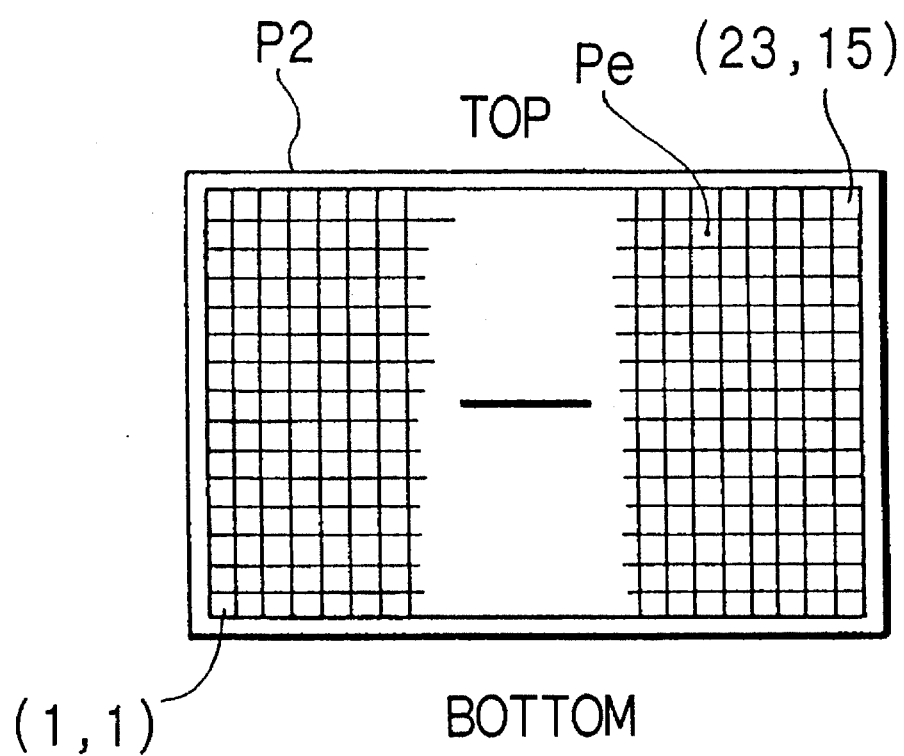
FIG. 2 shows the division of the photometry element of the FIG. 1 camera into multiple photometry areas.

The photometry element 11 is a two dimensional CCD (charge coupled device) used in a video camera etc. and measures light by dividing the secondary image P2 formed on its surface into multiple photometry areas Pe as shown in FIG. 2. In the example shown in the drawing, the length of secondary image P2 is divided into 23 intervals and the width is divided into 15 intervals, resulting in a total of 345 areas in which photometry operations are performed. The address of each photometry area Pe is determined by assigning (1,1) to the bottom left area and (23,15) to the top right area with the camera body kept in the horizontal position.

Figure 3:
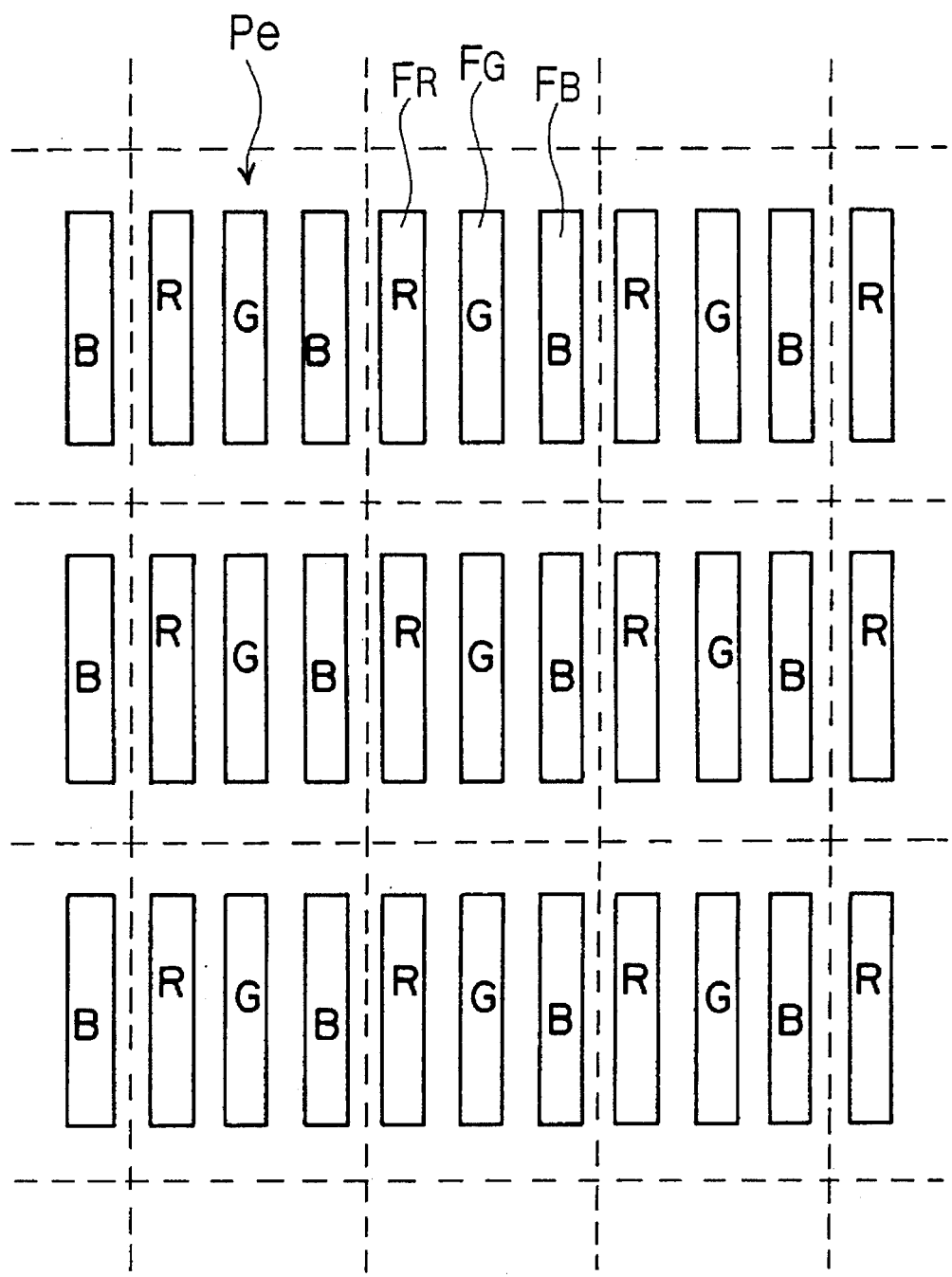
FIG. 3 is a magnified view of a portion of the photometry areas in FIG. 2.

As shown in FIG. 3, the photometry element 11 is equipped with R (red), G (Green) and B (Blue) filters F{r}, F{g} and F{b} for each photometry area Pe. Moreover, a photo-electric element is provided at the bottom of each filter F{r}, F{g} and F{b} to measure brightness for each photometry area Pe and to measure three primary colors for each photometry area Pe. The filters are not necessarily provided in the form of the three primary colors, but can be in the form of colors which are complimentary to the primary colors.

Figure 4:
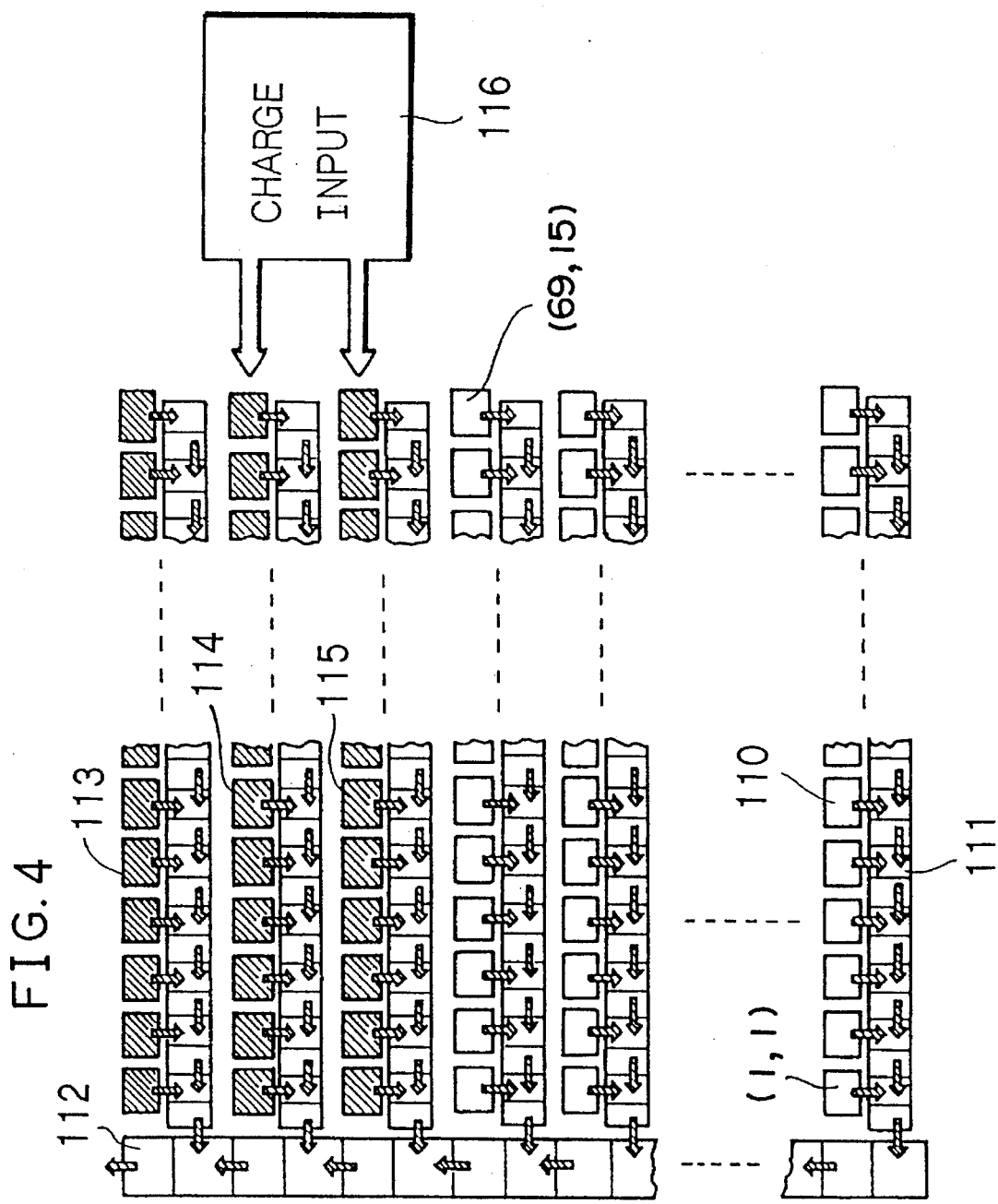
FIG. 4 shows the circuit configuration to retrieve the electric charge accumulated in the photometry areas.

As shown in FIG. 4, photo-electric elements 110 of the photometry element 11 are arranged in such a way to form a matrix of 69 columns, three per photometry area Pe, and 15 rows as mentioned before. A shift register 111 is provided at the bottom of each row of photo-electric elements 110 and the entire electric charge generated by photo-electric elements 110 is transferred to the shift register 111 immediately upon its accumulation for a specified time in the accumulation component, not shown. The shift register 111 transmits the electric charge from each of the photo-electric elements 110 in series towards a left-most vertical register 112 of the shift register 111 according to a clock pulse, as is well known. The vertical register 112 transmits the charge coming from the shift register 111 toward the top. The electric charge thus transmitted is converted to a voltage by the floating diffusion, not shown, and is output through an amplifier.

Three optically dark components 113, 114, and 115 are provided on top of the uppermost row of photo-electric elements 110 of the photometry element 11, by which light is prevented from pouring upon the photo-electric elements 110 provided beneath three optically dark components 113, 114 and 115. The optically dark component 113 of the top level generates dark signals (the electric charge when the amount of incidental light is zero) for photo-electric elements 110 and the signals are retrieved from the shift register 111 through the vertical register 112, and are converted to voltage. By reducing the output from the photo-electric elements 110 by the amount of voltage based upon the signals from the optically dark component 113, an offset correction of an amount equivalent to the dark signal of photo-electric elements 110 is accomplished.

Large unequal electric charges are entered from a charge input component 116 to the optically dark components 114 of the middle level and 115 of the bottom level. Since the outputs from these optically dark components 114 and 115 vary according to the temperature of the photo-electric elements, it is possible to correct the output change caused by temperature. The reason for providing two rows of optically dark components 114 and 115 is to enable gamma correction for slope as well as offset correction for the correction of the output associated with temperature changes.

Figure 5:
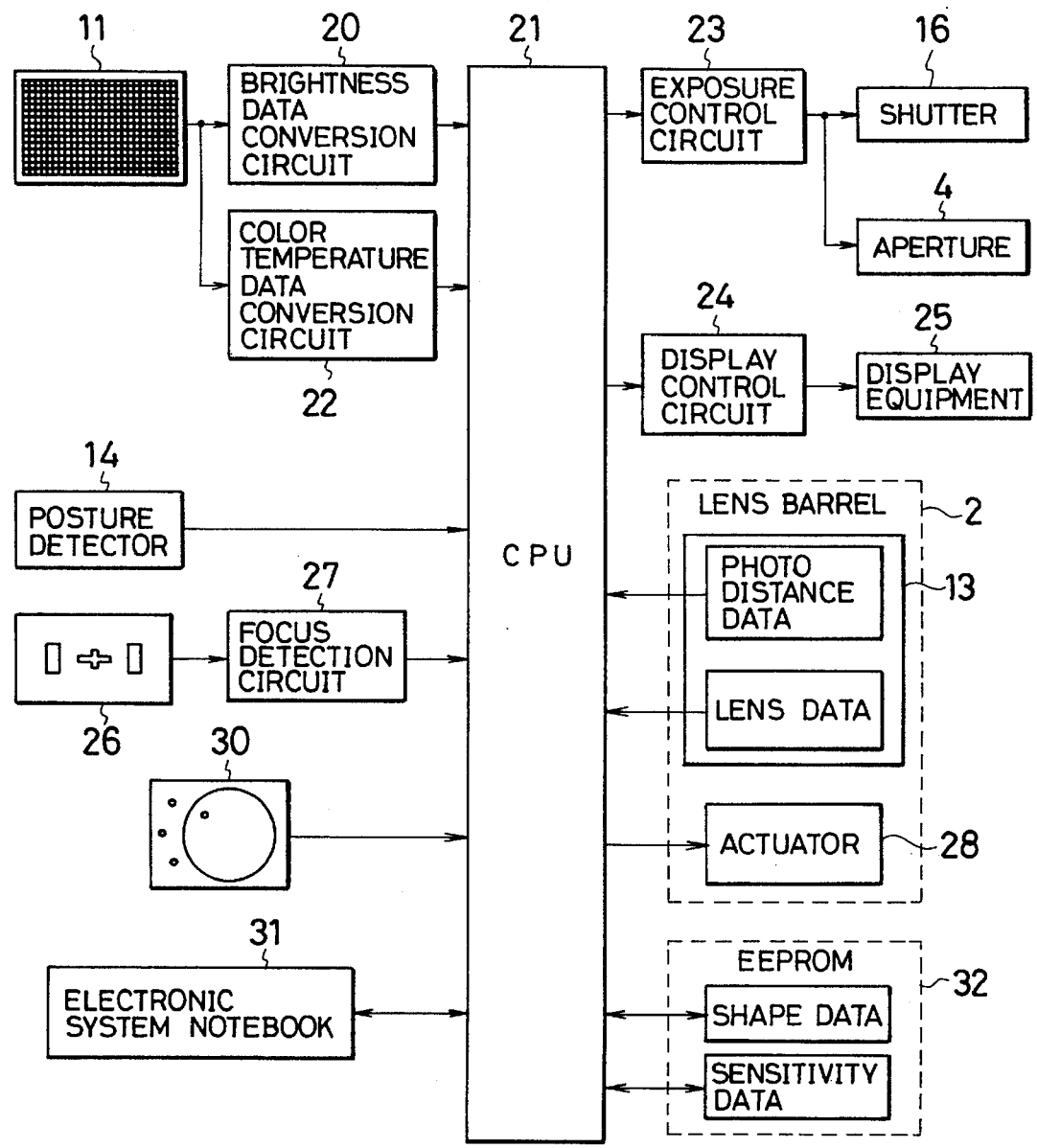
FIG. 5 is a block diagram of the control system of the camera in FIG. 1.
Figure 6A:
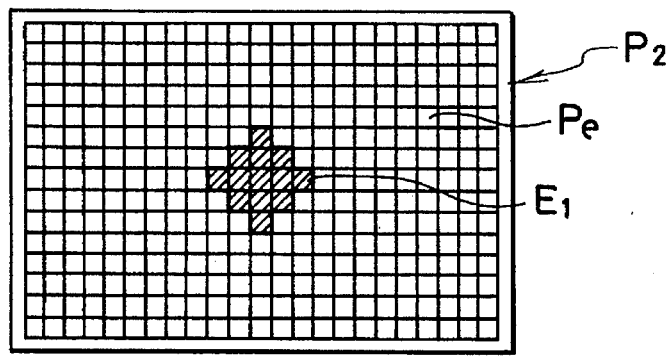
FIGS. 6A–6D show possible boundary shapes of the photometry region that can be selected.
Figure 6B:
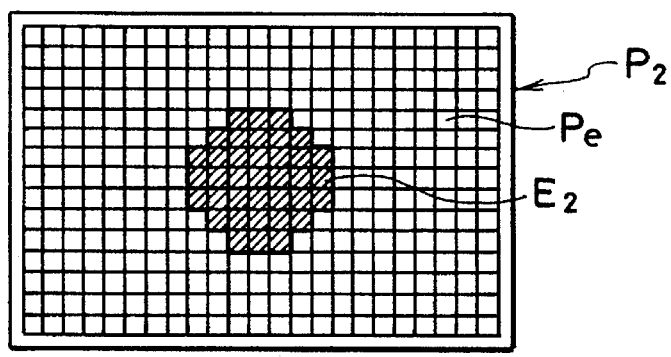
Figure 6C:
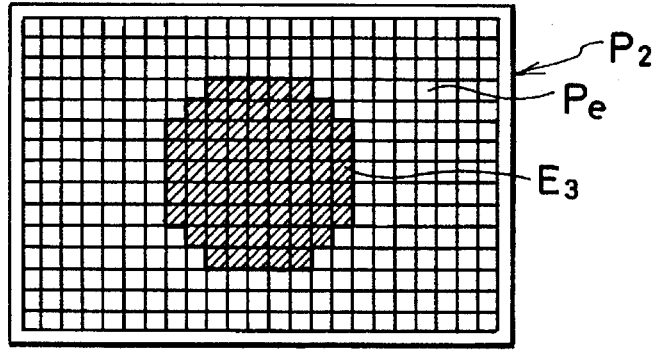
Figure 6D:
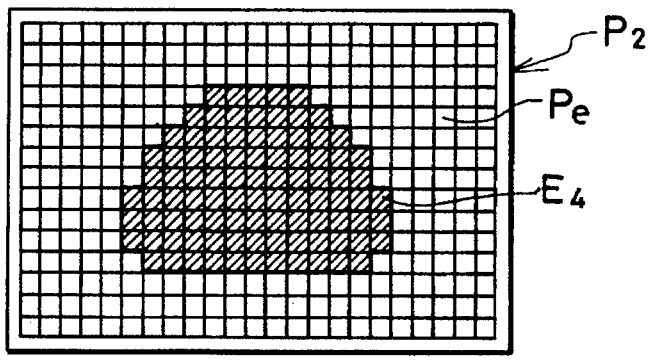

As shown in FIG. 5, the output from the photometry element 11 is converted to a brightness value by means of a brightness data conversion circuit 20 and is entered into a CPU 21. At the same time it also is converted to color temperature by a color temperature data conversion circuit 22 and is entered into the CPU 21. Based upon the data output from the circuits 20 and 22, photographic distance data sent from the ROM 13 in the lens of lens barrel 2, and data sent from the posture detector 14 to discern the posture of the camera, the CPU 21 computes the optimum exposure value and outputs the exposure control signal to an exposure control circuit 23. The CPU 21 outputs the exposure control signal to the exposure control circuit 23 based on the results of computations performed when the release button, not shown, is completely depressed. The exposure control circuit 23 drives the shutter 16 and the diaphragm 4 of the camera to obtain the optimum exposure based on the exposure control signal. Additionally, the optimum exposure value thus computed is displayed on a display 25 (for example, a liquid crystal panel) through display control circuit 24. A focus detector 26 detects the focus adjustment condition at left, middle and right sections of the photo-screen. The output from focus detector 26 is entered into the CPU 21 after being processed by a focus detection circuit 27. The CPU 21 computes the focus position based on the focus data supplied from the focus detection circuit 27. Based on these computations, the CPU 21 drives a driving actuator 28 inside the lens barrel and moves the photo lenses 3a and 3b to the desired focus position corresponding to the object to be photographed.

A photometry mode selection switch 30 is used to change a photometry mode (for example, between a center emphasis mode, a spot mode, and a multimode). The CPU 21 selects from brightness values and color temperatures for each photometry area Pe (see FIG. 2) which are entered into the CPU 21 from the brightness data conversion circuit 20 and the color temperature data conversion circuit 22. Only the brightness value and color temperature corresponding to the addresses selected based on the position of the photometry mode selection switch 30 are used as computation data for the exposure value. In other words, when the photometry mode selection switch 30 is in the "multi" position, the brightness values and color temperatures of entire 345 photometry areas Pe, shown in FIG. 2, are used as computation data for the exposure value. When the switch is in the "spot" position, the brightness values and the color temperatures of the photometry areas Pe only in the central portion of the subject field are used as computation data for exposure value. When the photometry mode selection switch 30 is in the "Center Emphasis" position, the brightness values and color temperatures of the photometry areas Pe located in certain sections (larger than those of the "spot" mode) covering the central portion of the subject field are used as computation data for exposure value. Hereafter, the set of photometry areas Pe which are the target of computations for the exposure value by the CPU 21 will be referred to as the photometry region.

An electronic system notebook 31 is detachably connected to the CPU 21 through the external equipment connection terminal 12 (see FIG. 1) and communicates with the CPU 21. In this example, a personal computer may be connected in place of the electronic system notebook 31.

The electronic system notebook 31 can select a boundary shape of the photometry region as well as sensitivity distribution of the photometry areas contained in the photometry region when the photometry mode selection switch 30 is in the "center emphasis" position. The electronic system notebook 31 can make these selections from the selection data transmitted from the CPU 21. Once the electronic system notebook 31 selects the boundary shape and the sensitivity distribution, it outputs to the CPU 21 code signals corresponding to these selections. The CPU 21, in turn, outputs to EEPROM 32 the selection signals of the boundary shape and the sensitivity distribution in accordance with the code signals received. Then EEPROM 32 outputs to the CPU 21 the data for boundary shape and sensitivity distribution in accordance with the selected signals from CPU 21, which stores the data supplied from the EEPROM 32 in its internal memory.

The boundary shape and the sensitivity distribution of the photometry region stored in EEPROM 32 are changed as needed depending on the camera 1. With this embodiment, the boundary shape can be selected from the first shape E1 representing a photometry region consisting of thirteen photometry areas Pe forming a rhombus shape in the central portion of the subject field P2 shown as a shaded area in FIG. 6A, or a second shape E2 representing a photometry region consisting of thirty-seven photometry areas Pe in the central portion of the subject field P2 shown as a shaded area in FIG. 6B, or a third shape E3 representing a photometry region consisting of sixty-nine photometry areas Pe in the central portion of the subject field P2 shown as a shaded area in FIG. 6C, or a fourth shape E4 representing a photometry region spreading towards the bottom like the "rice ball" shown in the central portion of the subject field P2 shown as a shaded area in the FIG. 6D.

Figure 7A:
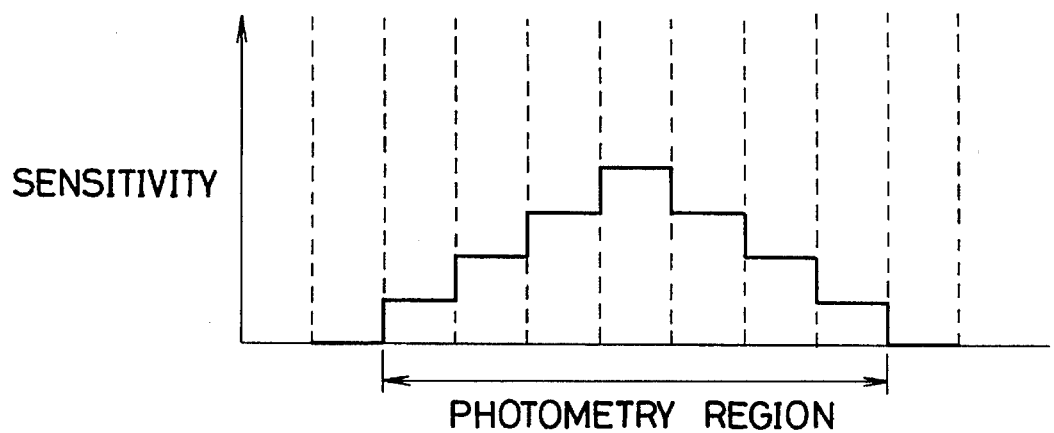
FIGS. 7A–7B show possible sensitivity distributions of the photometry region that can be selected.
Figure 7B:
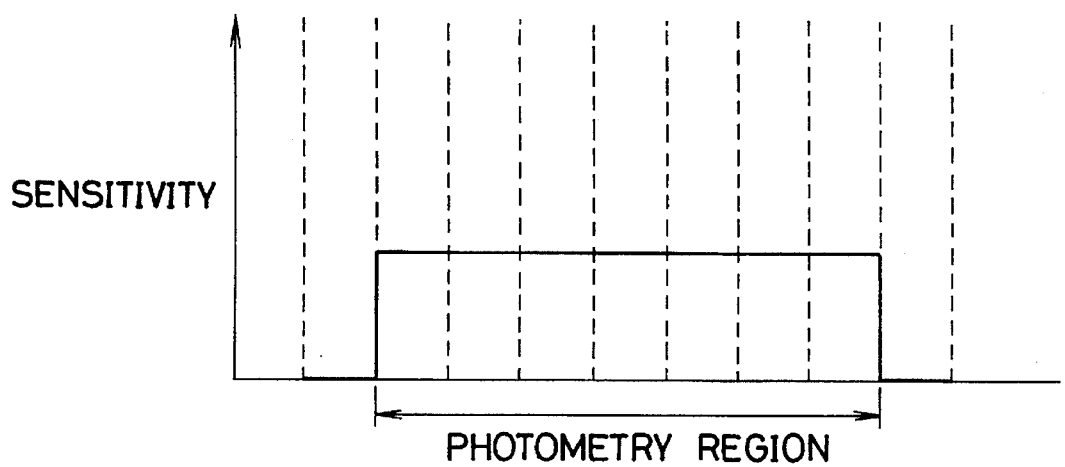

Furthermore, the sensitivity distribution can be chosen from the mountain shape type in which the center areas of the photometry region have a higher sensitivity than the surrounding areas as shown in FIG. 7A or the flat shape type in which the sensitivity is equal throughout the entire photometry region as shown in FIG. 7B. FIGS. 7A–7B are sensitivity distributions on the horizontal center line in the second shape E2 of FIG. 6B. Similarly, mountain shapes and flat shapes are prepared for each of the first shape E1, the third shape E3 and the fourth shape E4, however, drawings for these shapes have been omitted. The sensitivity distribution of the photometry areas Pe is established by changing, for example, the weight of the brightness value data and color temperature data taken into the CPU 21.

With the camera described in the current embodiment, when the electronic system notebook 31 is connected to the external equipment connection terminal 12 and the electronic system notebook 31 outputs code signals to establish photometry conditions, other processes in the CPU 21 are stopped and the photometry conditions at the time of center emphasis are established following the steps shown in FIG. 8.

First, in step S1, the electronic system notebook 31 receives code signals. In the next step S2, the boundary shape and sensitivity distribution of the photometry region corresponding to the code signals are read from EEPROM 32 and are stored in the internal memory of the CPU 21. When the signals are memorized, the CPU 21 resumes the original processing.

When the photometry mode selection switch 30 is changed to center emphasis and the release switch, not shown, begins operation with a half depression, the CPU 21 processes the data from the photo-electric element 11 according to the boundary shape and sensitivity distribution of the photometry region memorized by its own internal memory, and computes the optimum exposure value. Then, the CPU executes a photograph operation by driving the diaphragm 4 and the shutter 16 based on the determined exposure value upon complete depression of the release button.

The photometry condition memorized by CPU 21 will not be lost even after separation of the electronic system notebook 31 from the external equipment connection terminal 12. Once the electronic system notebook is separated from the camera, the photometry conditions cannot be changed during the selection of center emphasis. Thus, the possibility of changing the photometry conditions by mistake during usage of the camera is eliminated.

With the present invention, the electronic system notebook 31 connected to the camera 1 through the external equipment connection terminal 12 instructs the boundary shape and sensitivity distribution in the center emphasis photometry mode, and it becomes unnecessary to provide operational components (for example, switches, buttons, etc.) to establish these conditions in the camera. Therefore, the camera need not become excessively large and complicated even if the number of possibilities of boundary shapes and sensitivity distributions of a photometry region is increased to make the establishment of diversified photometry conditions possible.

As described above, not only the boundary shape of the photometry region, but also sensitivity distribution for each photometry area Pe contained in the photometry region is made to be changeable. This enables the photometry conditions to be changed in more diverse ways than if only the shape of the photometry region is changed.

Of course, the components related to changing of sensitivity distribution may be omitted when it is desired to change only the boundary shape of the photometry region in the center emphasis photometry mode. Conversely it is possible to change only the sensitivity distribution within a predetermined photometry region. The changing of sensitivity distribution is not limited to center emphasis photometry mode. It is possible to change the sensitivity distribution in a diverse way such as by raising the sensitivity of the central areas while lowering the sensitivity of surrounding areas, even when the entire subject field (i.e., all 345 areas in the illustrated example) is used as the photometry field.

Additionally, instead of using an external mechanism such as the electronic system notebook, for the establishment of sensitivity distribution, a switch can be provided in the camera to switch the sensitivity distribution and the CPU 21 can output to the EEPROM 32 selection signals according to a switching condition of the switch.

The changing of the boundary shape of the photometry region can be performed not only during the center emphasis photometry mode selection, but in all the cases which limit the photometry region to a portion of the subject field.

In the described embodiment, the change of boundary shape of the photometry region is accomplished by selecting photometry areas Pe, which becomes the target of exposure computation performed by CPU 21. However, it is possible to enter outputs from the light sensitivity components corresponding only to the photometry areas located in the photometry region into CPU 21 by adopting a so called CMD photo-electric element as the photometry element 11, because CMD photo-electric elements can selectively output the electric charge of only a specified address.

Furthermore, while the boundary shapes and the sensitivity distributions are pre-stored in EEPROM 32, the address of the photometry areas Pe to be included in the photometry region may be instructed and the sensitivity distribution may be specified using the electronic system notebook or a personal computer.

As explained above, the boundary shape of the photometry region is determined based on the boundary shape instruction signals sent from outside of the camera. Accordingly, it is unnecessary to provide operation components in the camera to change boundary shape. Thus, the possibility of confusion caused by erroneous operation during usage of the camera is eliminated, and a variety of boundary shape changes of a photometry region become possible without preventing smaller cameras from being made.

Additionally, the sensitivity distribution of the photometry areas contained in the photometry region can be changed, providing a more diversified change of photometry conditions than when only the boundary shape of the photometry region is changeable.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

I claim:

1. A camera having a photometry system capable of establishing a portion of a subject field as a photometry region from which photometry measurements are made, said camera comprising:

a boundary shape signal receiving device that receives a boundary shape instruction signal transmitted externally of the camera, said boundary shape instruction signal indicating a boundary shape to be established for the photometry region of the subject field; and a boundary shape establishment means, coupled to the boundary shape signal receiving device, that establishes the boundary shape of the photometry region based on the boundary shape instruction signal received by the boundary shape signal receiving device.

2. The camera of claim 1, wherein the boundary shape establishment device includes:

a storage device that stores a plurality of different boundary shapes that can be established for the photometry region; and a boundary shape selection device that selects a boundary shape corresponding to the boundary shape instruction signal from the plurality of boundary shapes stored in the storage device as the boundary shape to be established for the photometry region.

3. The camera of claim 1, wherein the photometry region is established in a central portion of the subject field.

4. The camera of claim 2, wherein the photometry region is established in a central portion of the subject field.

5. The camera of claim 2, wherein the storage device is a memory located in the camera.

6. The camera of claim 5, wherein the memory is an EEPROM.

7. The camera of claim 1, wherein the boundary shape signal receiving device is a connection terminal that receives a mating connection terminal from an input device separate from the camera.

8. A camera having a photometry system that measures light received by a photometry region of a subject field and that is capable of establishing a portion of the subject field as a photometry region from which photometry measurements are made, the photometry region being divided into multiple photometry areas, said camera comprising:

a boundary shape signal receiving device that receives a boundary shape instruction signal transmitted externally of the camera, said boundary shape instruction signal indicating a boundary shape to be established for the photometry region of the subject field;

a boundary shape establishment device, coupled to the boundary shape signal receiving device, that establishes the boundary shape of the photometry region based on the boundary shape instruction signal received by the boundary shape signal receiving device;

a sensitivity distribution instruction device that supplies a sensitivity distribution instruction to instruct sensitivity distribution of the photometry areas in the photometry region; and a sensitivity distribution establishment device, coupled to said sensitivity distribution instruction device, that establishes the sensitivity distribution of the photometry areas in the photometry region based on the sensitivity distribution instruction supplied by the sensitivity distribution instruction device.

9. The camera of claim 8, further comprising a sensitivity signal receiving device that receives a sensitivity distribution instruction signal transmitted externally of the camera, said sensitivity distribution instruction signal indicating a sensitivity distribution to be established for the photometry areas of the photometry region, said sensitivity signal receiving device coupled to said sensitivity distribution instruction device so as to cause the sensitivity distribution instruction device to supply said sensitivity distribution instruction to instruct the sensitivity distribution of the photometry areas based on the sensitivity distribution signal received by the sensitivity signal receiving device.

10. The camera of claim 8, wherein the boundary shape establishment device includes a memory located in the camera.

11. The camera of claim 10, wherein the memory is an EEPROM.

12. A camera having a photometry system that measures light received by a photometry region of a subject field, the photometry region being divided into multiple photometry areas, said camera comprising:

a sensitivity distribution instruction device that supplies a sensitivity distribution instruction to instruct sensitivity distribution of the photometry areas in the photometry region; and a sensitivity distribution establishment device, coupled to said sensitivity distribution instruction device, that establishes the sensitivity distribution of the photometry areas in the photometry region based on the sensitivity distribution instruction supplied by the sensitivity distribution instruction device;

said sensitivity distribution establishment device including:

a storage device that stores a plurality of different sensitivity distributions that can be established for the photometry areas of the photometry region; and a sensitivity distribution selection device that selects a sensitivity distribution corresponding to the instruction from the sensitivity distribution instruction device from the plurality of sensitivity distributions stored in the storage device as the sensitivity distribution to be established for the photometry areas of the photometry region.

13. A camera having a photometry system that measures light received by a photometry region of a subject field, the photometry region being divided into multiple photometry areas, said camera comprising:

a sensitivity distribution instruction device that supplies a sensitivity distribution instruction to instruct sensitivity distribution of the photometry areas in the photometry region;

a sensitivity distribution establishment device, coupled to said sensitivity distribution instruction device, that establishes the sensitivity distribution of the photometry areas in the photometry region based on the sensitivity distribution instruction supplied by the sensitivity distribution instruction device;

a boundary shape signal receiving device that receives a boundary shape instruction signal transmitted externally of the camera, said boundary shape instruction signal indicating a boundary shape to be established for the photometry region of the subject field; and a boundary shape establishment device, coupled to the boundary shape signal receiving device, that establishes the boundary shape of the photometry region based on the boundary shape instruction signal received by the boundary shape signal receiving device.

14. A camera having a photometry system that measures light received by a photometry region of a subject field, the photometry region being divided into multiple photometry areas, said camera comprising:

a sensitivity distribution instruction device that supplies a sensitivity distribution instruction to instruct sensitivity distribution of the photometry areas in the photometry region;

a sensitivity distribution establishment device, coupled to said sensitivity distribution instruction device, that establishes the sensitivity distribution of the photometry areas in the photometry region based on the sensitivity distribution instruction supplied by the sensitivity distribution instruction device; and a sensitivity signal receiving device that receives a sensitivity distribution instruction signal transmitted externally of the camera, said sensitivity distribution instruction signal indicating a sensitivity distribution to be established for the photometry areas of the photometry region, said sensitivity signal receiving device coupled to said sensitivity distribution instruction device so as to cause the sensitivity distribution instruction device to supply said sensitivity distribution instruction to instruct the sensitivity distribution of the photometry areas based on the sensitivity distribution signal received by the sensitivity signal receiving device, said sensitivity distribution establishment device including:

a storage device that stores a plurality of different sensitivity distributions that can be established for the photometry areas of the photometry region; and a sensitivity distribution selection device that selects a sensitivity distribution corresponding to the instruction from the sensitivity distribution instruction device from the plurality of sensitivity distributions stored in the storage device as the sensitivity distribution to be established for the photometry areas of the photometry region.

15. A camera having a photometry system that measures light received by a photometry region of a subject field, the photometry region being divided into multiple photometry areas, said camera comprising:

a sensitivity distribution instruction device that supplies a sensitivity distribution instruction to instruct sensitivity distribution of the photometry areas in the photometry region;

a sensitivity distribution establishment device, coupled to said sensitivity distribution instruction device, that establishes the sensitivity distribution of the photometry areas in the photometry region based on the sensitivity distribution instruction supplied by the sensitivity distribution instruction device; and a sensitivity signal receiving device that receives a sensitivity distribution instruction signal transmitted externally of the camera, said sensitivity distribution instruction signal indicating a sensitivity distribution to be established for the photometry areas of the photometry region, said sensitivity signal receiving device coupled to said sensitivity distribution instruction device so as to cause the sensitivity distribution instruction device to supply said sensitivity distribution instruction to instruct the sensitivity distribution of the photometry areas based on the sensitivity distribution signal received by the sensitivity signal receiving device;

said sensitivity signal receiving device including a connection terminal that receives a mating connection terminal from an input device separate from the camera.

16. A camera having a photometry system that measures light received by a photometry region of a subject field, the photometry region being divided into multiple photometry areas, said camera comprising:

a sensitivity distribution instruction device that supplies a sensitivity distribution instruction to instruct sensitivity distribution of the photometry areas in the photometry region;

a sensitivity distribution establishment device, coupled to said sensitivity distribution instruction device, that establishes the sensitivity distribution of the photometry areas in the photometry region based on the sensitivity distribution instruction supplied by the sensitivity distribution instruction device;

a sensitivity signal receiving device that receives a sensitivity distribution instruction signal transmitted externally of the camera, said sensitivity distribution instruction signal indicating a sensitivity distribution to be established for the photometry areas of the photometry region, said sensitivity signal receiving device coupled to said sensitivity distribution instruction device so as to cause the sensitivity distribution instruction device to supply said sensitivity distribution instruction to instruct the sensitivity distribution of the photometry areas based on the sensitivity distribution signal received by the sensitivity signal receiving device;

a boundary shape signal receiving device that receives a boundary shape instruction signal transmitted externally of the camera, said boundary shape instruction signal indicating a boundary shape to be established for the photometry region of the subject field; and a boundary shape establishment device, coupled to the boundary shape signal receiving device, that establishes the boundary shape of the photometry region based on the boundary shape instruction signal received by the boundary shape signal receiving device.

17. The camera of claim 16, wherein said sensitivity signal receiving device and said boundary shape signal receiving device are a connection terminal that receives a mating connection terminal from an input device separate from the camera.

18. A method of establishing photometry conditions of a photometry system having a photometry region corresponding to a portion of a subject field from which photometry measurements are made, the photometry region being divided into multiple photometry areas, said method comprising:

receiving a boundary shape instruction signal that indicates a boundary shape to be established for the photometry region of the subject field, said boundary shape instruction signal being received by said camera and having been transmitted from a device located externally of the camera;

establishing the boundary shape of the photometry region based on the received boundary shape instruction signal;

supplying a sensitivity distribution instruction to instruct sensitivity distribution of the photometry areas in the photometry region of the subject field; and establishing the sensitivity distribution of the photometry areas in the photometry region based on the received sensitivity distribution instruction.

19. The method of claim 18, further comprising:

receiving a sensitivity distribution instruction signal that indicates the sensitivity distribution instruction to be established for the photometry areas of the photometry region, said sensitivity distribution instruction signal being received by said camera and having been transmitted from said device located externally of the camera.

* * * * *